(12) United States Patent
Ohashi

(10) Patent No.: US 6,796,486 B2
(45) Date of Patent: Sep. 28, 2004

(54) DOCUMENT REVIEW APPARATUS, A DOCUMENT REVIEW SYSTEM, AND A COMPUTER PRODUCT

(75) Inventor: Tadashi Ohashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/782,084

(22) Filed: Feb. 14, 2001

(65) Prior Publication Data

US 2001/0010329 A1 Aug. 2, 2001

Related U.S. Application Data

(63) Continuation of application No. PCT/JP98/04059, filed on Sep. 10, 1998.

(51) Int. Cl.[7] .............................................. G06F 17/00
(52) U.S. Cl. ...................... 235/375; 235/376; 235/379; 707/512; 707/530
(58) Field of Search ................................ 235/375, 376, 235/379; 707/512, 530

(56) References Cited

U.S. PATENT DOCUMENTS

| | | | | |
|---|---|---|---|---|
| 5,091,727 A | * | 2/1992 | Mahmood | 340/932.2 |
| 5,265,033 A | * | 11/1993 | Vajk et al. | 235/380 |
| 5,433,483 A | * | 7/1995 | Yu | 283/57 |
| 5,548,753 A | * | 8/1996 | Linstead et al. | 395/600 |
| 5,671,428 A | * | 9/1997 | Muranaga et al. | 345/751 |
| 5,869,819 A | * | 2/1999 | Knowles et al. | 235/375 |
| 5,940,844 A | * | 8/1999 | Cahill et al. | 707/526 |
| 5,973,693 A | * | 10/1999 | Light | 345/835 |
| 5,999,925 A | * | 12/1999 | Evans | 707/5 |
| 6,243,722 B1 | * | 6/2001 | Day et al. | 707/512 |
| 6,289,460 B1 | * | 9/2001 | Hajmiragha | 700/83 |
| 6,327,611 B1 | * | 12/2001 | Everingham | 707/10 |

FOREIGN PATENT DOCUMENTS

| | | | |
|---|---|---|---|
| EP | 0921486a2 | * | 9/1999 |
| JP | 4-16048 | | 1/1992 |
| JP | 4-288664 | | 10/1992 |
| JP | 05-210681 | | 8/1993 |
| JP | 06-274493 | | 9/1994 |
| JP | HEI 7-200552 A | | 8/1995 |
| JP | HEI 8-46637 A | | 2/1996 |
| JP | HEI 8-147381 A | | 6/1996 |
| JP | 09-083564 | | 3/1997 |
| JP | 09-190454 | | 7/1997 |

* cited by examiner

*Primary Examiner*—Michael G. Lee
*Assistant Examiner*—Seung H Lee
(74) *Attorney, Agent, or Firm*—Staas & Halsey LLP

(57) ABSTRACT

Disclosed is a document review apparatus which efficiently carries out document review by using a network. A document review apparatus comprises a memory unit which stores a reviewed form comprising a written document, contents thereof to be reviewed by a plurality of reviewers. The document review apparatus receives a response, comprising information holding a review result of the reviewed form from another apparatus, and stores it in the memory unit; when a predetermined number of responses have been stored, the document review apparatus creates statistical data relating to the contents of the responses, and displays the created statistical data in order to assist a user (the creator of the reviewed form) in revising the reviewed form.

12 Claims, 17 Drawing Sheets

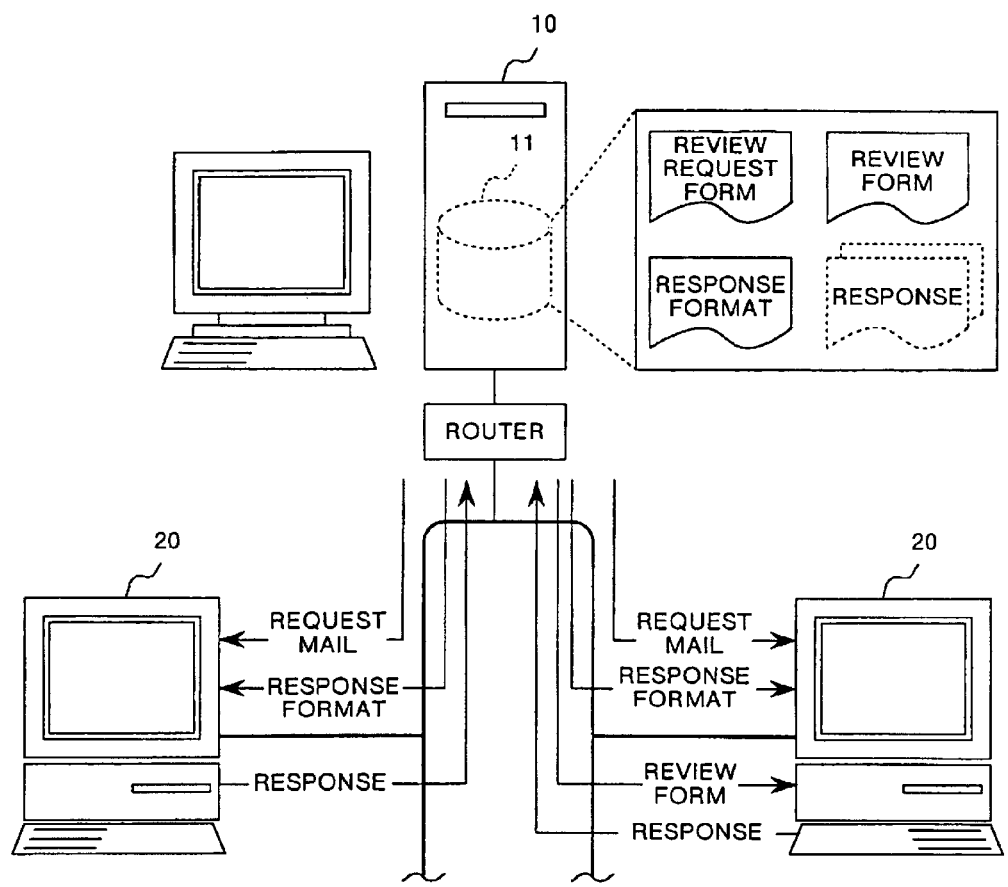

FIG.3

| | |
|---|---|
| ATSUGI  XX HEAD OFFICE) | MR./MS. YYYY SECTION CHIEF |
| ATSUGI ) | MR./MS. YYYY SECTION CHIEF |
| ATSUGI ) | MR./MS. YYYY SECTION CHIEF |
| ATSUGI ) | MR./MS. YYYY SECTION CHIEF |
| ATSUGI ) | MR./MS. YYYY SECTION CHIEF |
| MINAMI-TAMA ) | MR./MS. YYYY SECTION CHIEF |
| MINAMI-TAMA ) | MR./MS. YYYY SECTION CHIEF |
| MINAMI-TAMA ) | MR./MS. YYYY SECTION CHIEF |
| KAWASAKI ) | MR./MS. YYYY GENERAL CHIEF |
| KAWASAKI ) | MR./MS. YYYY GENERAL CHIEF |
| KAWASAKI ) | MR./MS. YYYY GENERAL CHIEF |
| KAWASAKI ) | MR./MS. YYYY SECTION CHIEF |
| KAWASAKI ) | MR./MS. YYYY SECTION CHIEF |
| KAWASAKI ) | MR./MS. YYYY SECTION CHIEF |
| KAWASAKI ) | MR./MS. YYYY SECTION CHIEF |
| KAWASAKI ) | MR./MS. YYYY SECTION CHIEF |
| KAWASAKI ) | MR./MS. YYYY SECTION CHIEF |
| MINAMI-TAMA ) | MR./MS. YYYY SECTION CHIEF |
| MINAMI-TAMA ) | MR./MS. YYYY SECTION CHIEF |

Rep No. X X X X X X
22 JUNE 1998
A CORP. INFORMATION
SYSTEM CHIEF

RE: DOCUMENT REVIEW OF "A CORP. DIAGRAM PROVISION
      MANAGEMENT STIPULATIONS TO RELEVANT COMPANIES"

I HAVE REVIEWED THE "A CORP. DIAGRAM PROVISION MANAGEMENT STIPULATIONS TO RELEVANT COMPANIES" (XY2058005). PLEASE COULD THE SECTION RESPONSIBLE REPLY TO THIS SECTION REGARDING THE REVIEW RESULT.
THE DEADLINE FOR REVIEW REQUETS IS TUESDAY 7 JULY, 1998.
PLEASE REFER TO WWW.abc.def.co.jp FOR THE URL STORING THE REVIEW TARGET FORM.

XYZ PROJECT MANAGER

FIG.4

| STANDARD NUMBER | STANDARD NAME | NUMBER PUBLISHED |
|---|---|---|
| X Y 2 0 5 8 0 0 0 5 | A CORP. DIAGRAM PROVISION MANAGEMENT STIPULATIONS TO RELEVANT COMPANIES | THREE |
| REVIEW REQUEST DEADLINE | PLEASE REPLY BY TUESDAY 7 JULY, 1998 | |

I HEREBY REQUEST A DOCUMENT REVIEW OF THE CONTENTS OF THE FOLLOWING REVISION.
[REASONS FOR REVISION]
RELATED COMPANIES TO WHOM DESIGN AND MANUFACTURING IS ENTRUSTED BY THIS COMPANY HAVE HITHERTO OBTAINED PERMISSION FROM THE OPERATIONS DESIGN SECTION OR INFORMATION MANAGEMENT SECTION EACH TIME THEY RECEIVE DIAGRAMS FROM THIS COMPANY. CONSEQUENTLY, IT IS TIME-CONSUMING TO SUPPLY THE DIAGRAMS TO THE RELATED COMPANIES, AND NOT ALWAYS POSSIBLE TO RECEIVE THE DIAGRAMS AT THE TIME WHEN THEY ARE NEEDED. TO SOLVE THIS, THIS STIPULATION ATTEMPTS TO SIMPLIFY THE PROCEDURES WITH THE RELATED COMPANIES, AND THEREBY MAKE THE PROCESS OF SUPPLYING DIAGRAMS TO THEM SMOOTHER.

[CONTENTS OF REVISION]
MAKE A CLEAR DISTINCTION BETWEEN CASE WHERE RELATED COMPANIES USE DIAGRAMS BELONGING TO A CORPORATION FOR PURPOSES OF DESIGN AND MANUFACTURING, AND CASES WHERE A CORPORATION ENTRUSTS DESIGN AND MANUFACTURING TO THE RELATED COMPANIES. ENABLE SUPPLY OF ELECTRONIC DATA USING A NETWORK SO THAT A CORPORATION DIAGRAMS CAN ALWAYS BE OBTAINED WHEN ENTRUSTING DESIGN AND MANUFACTURING. CHANGE STANDARD NAME TO "A CORP. DIAGRAM AND ELECTRONIC DATA PROVISION MANAGEMENT STIPULATIONS TO RELATED COMPANIES". FURTHERMORE, WHEN AN OPERATION DESIGN SECTION OF A CORPORATION USES THE DIAGRAMS OF OTHER OPERATION DESIGN SECTIONS, IT SHOULD OBTAIN PERMISSION TO USE THEM AND SUPPLY THE DIAGRAMS TO THE RELATED COMPANIES.

[REVIEW REQUEST FORM] XY2058005 "A CORP. DIAGRAM AND ELECTRONIC DATA PROVISION MANAGEMENT STIPULATIONS TO RELATED COMPANIES"
   SUPERVISOR: OHASHI (TEL: XXXX-XXXX), E-mail (bbbbbb@bb.cccccc.co.jp)

— — — —PLEASE USE THE SECTION BELOW FOR YOUR REPLY.— — — —

KAWASAKI A CORPORATION INFORMATION SYSTEM SECTION CHIEF
E-mail (aaaaaa@bb.cccccc.co.jp)

Rep No.nnnnnn
1998
_____CHIEF

RE: (RESPONSE) TO "A CORP. DIAGRAM AND ELECTRONIC DATA PROVISION MANAGEMENT STIPULATIONS TO RELATED COMPANIES"

WITH REGARD TO YOUR REQUEST TO REVIEW THIS REPORT, WE RESPOND AS FOLLOWS:

NEED FOR CORRECTION: (1) REVISE AS SUGGESTED (2) REVISION NEEDS CORRECTION

CORRECTIONS: WE ATTACH A CORRECTION FORM.

3   EVALUATION
   3-1 REFERENCE STANDARD
   3-2 CONFLICT STANDARD
      1 OVERSEAS EXCHANGE MANAGEMENT LAWS TABLE
      2 KANAGAWA PREFECTURAL REGULATIONS

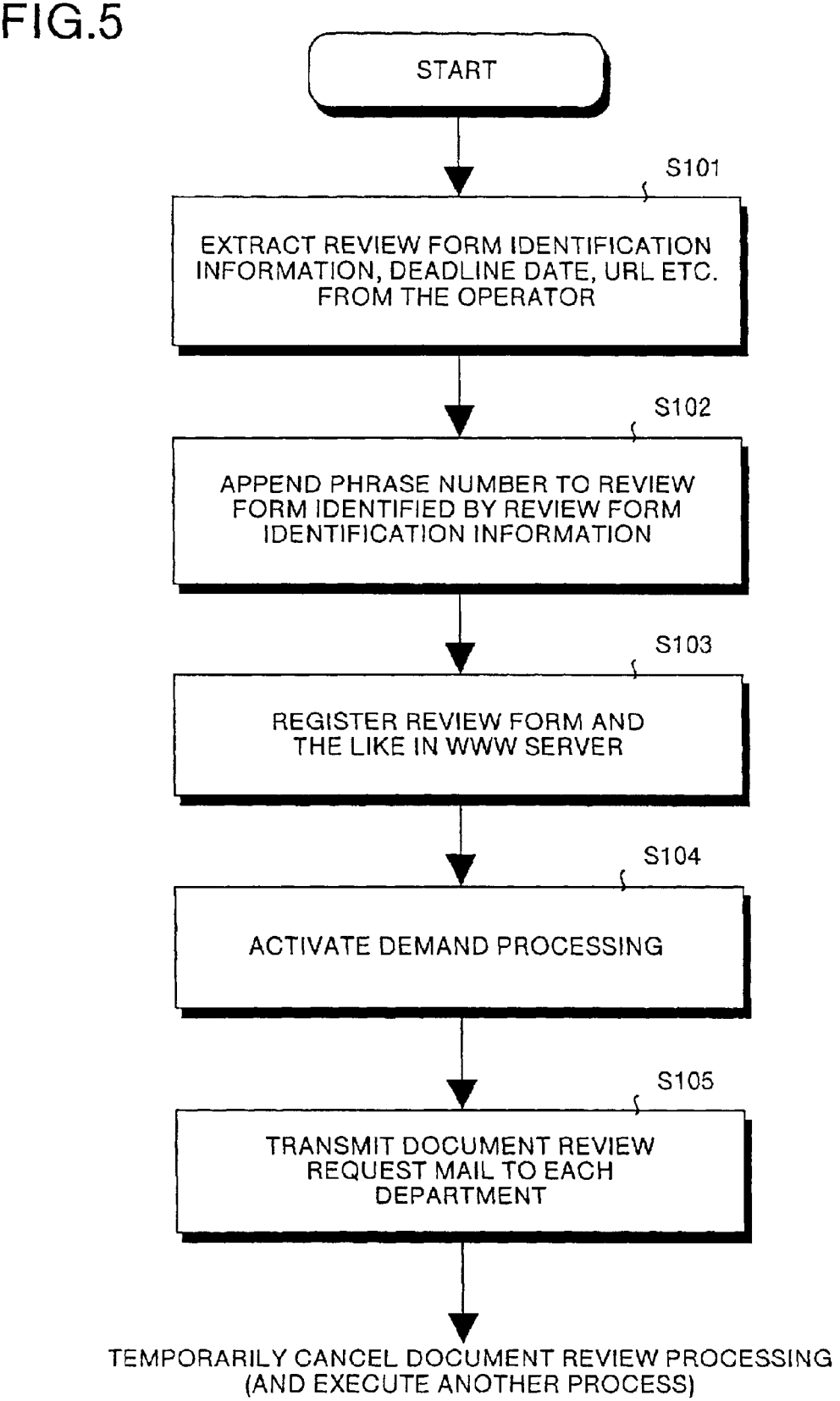

FIG.6

TO LIST   TO REVISION SUMMARY   TO INDEX   TO PREVIOUS PAGE   TO NEXT PAGE

1. AIMS

ELECTRONIC MANUFACTURING DIAGRAMS, WHICH ARE DESIGNED BY OPERATIONS SECTIONS OF THE INFORMATION PROCESSING DEPARTMENT OF A CORP. AND REGISTERED AT THE INFORMATION MANAGEMENT SOURCE, MUST BE PROVIDED TO RELATED COMPANIES VIA A NETWORK. THIS STIPULATION AIMS TO PROVIDE A CLEAR DELIVERY MANAGING METHOD FOR SMOOTHLY SUPPLYING DIAGRAMS, WHICH HAVE BEEN DELEVOPED BY OPERATION SECTIONS OF A CORP., TO THE RELATED COMPANIES.

2. RELEVANT STANDARDS

1) XXUC3#0005   A CORP. DIAGRAM PROVISION MANAGING STIPULATION
2) PZ23456789   DIAGRAM REGISTRATION DISTRIBUTION STIPULATION
3) UZL71-0055   DIAGRAM COPY REQUEST AND PROVISION STIPULATION TO EXTERNAL
4) XX272-4501   DOCUMENT MANAGING CONTROL GUIDE (FOR FACTORY USE)

3. FIELD OF APPLICABILITY 3-2 APPLICABLE SECTIONS

APPLICABLE TO ALL OPERATION SECTIONS (HARDWARE) WITHIN THE INFORMATION PROCESSING DEPARTMENT 3-2 TARGET DIAGRAMS

DIAGRAMS USED BY DESIGN SECTIONS AND THE LIKE OF OTHER OPERATION SECTIONS WHICH ARE DIFFERENT TO DESIGN SECTIONS OF DIAGRAM DESIGNER IN THE APPLICABLE SECTIONS, AND WHICH ARE REGISTERED AT THE INFORMATION PROCESSING SOURCE.

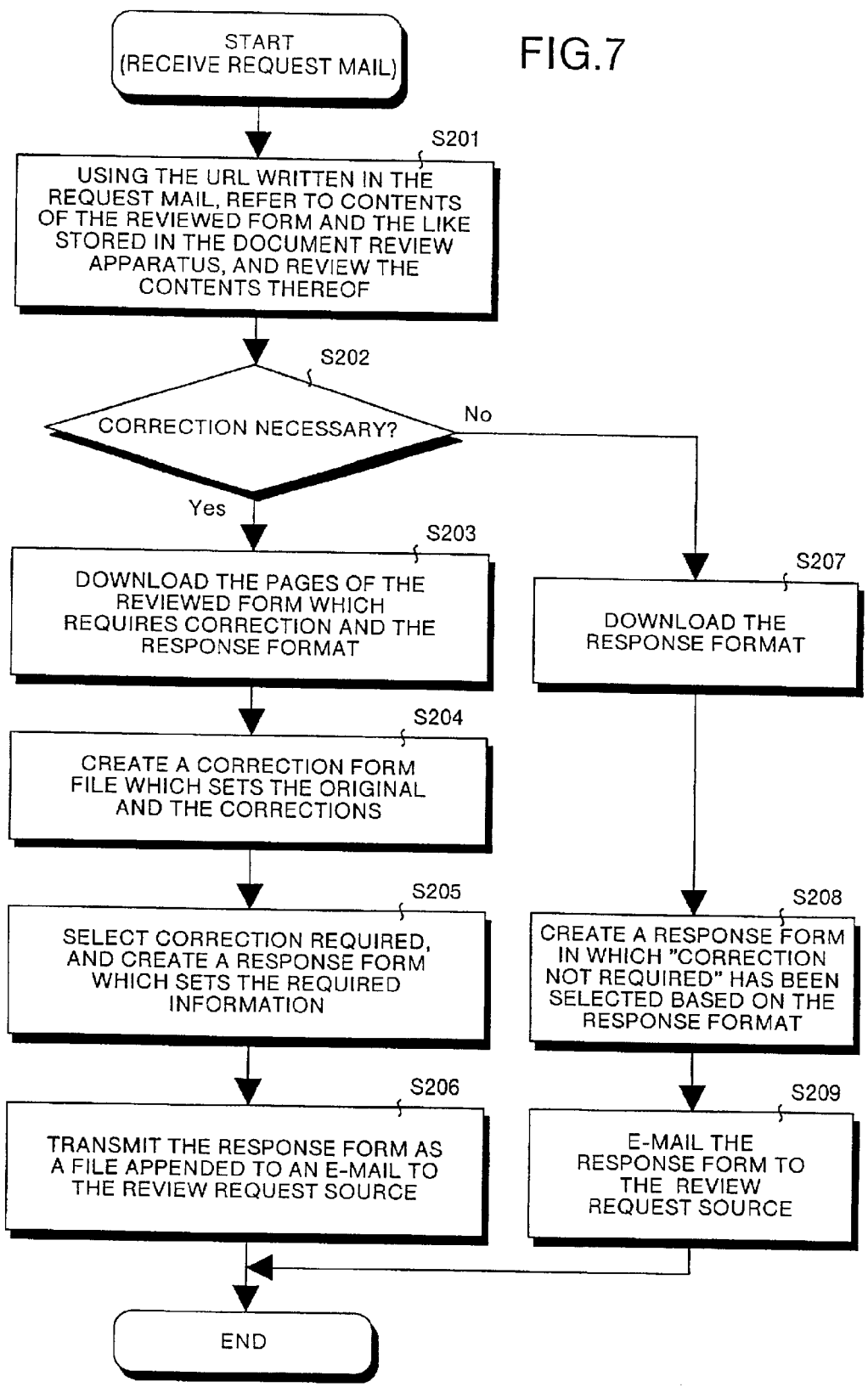

FIG.8

BREAK NUMBER ⇨ | 4-2-8
                (1)                    (2)
                THIS STANDARD RELATE TO SPECIFICATIONS FOR
ORIGINAL       (3)              (4)
(PRIMARY PART) ⇨ THE MANUFACTURE OF AN ELECTRONIC
                (5)
                CALCULATOR...

CORRECTION ⇨ | THIS STANDARD RELATES TO

FIG.9

```
KAWASAKI A CORP)  INFORMATION SYSTEM SECTION
             E-mail (aaaaaa@bb.ccccccc.co.jp)
                                        Rep No.nnnnnn
                                        1998
                                        _____ CHIEF RE: (RESPONSE) TO "A CORP. DIAGRAM AND ELECTRONIC DATA
       PROVISION MANAGEMENT STIPULATIONS TO RELATED COMPANIES"

WITH REGARD TO YOUR REQUEST TO REVIEW THIS REPORT, WE RESPOND
   AS FOLLOWS

NEED FOR CORRECTION : 2   (1) REVISE AS SUGGESTED (2) REVISION
   NEEDS CORRECTION
   CORRECTIONS: WE HAVE ATTACHED A CORRECTION FORM.

3  EVALUATION
   3—1   REFERENCE STANDARD
           Z U 1 2 3 4 5
           K X 6 6 7 7 8 8

3—2   CONFLICT STIPULATION
         1  OVERSEAS EXCHANGE MANAGING REGULATIONS TABLE
            : CONFLICTS WITH ARTICLE 20, CLAUSE 4 NO.1            6-1- 1  ( 2)
         2  KANAGAWA PREFECTURAL REGULATIONS
            : CONFLICTS WITH CHAPTER 4, ARTICLE 26, CLAUSE 42     5-2- 8  (15)
         3  COMPANY STANDARDS
            : CONFLICTS WITH PP000/01 CLAUSE 6-4                  5-2- 8  ( 4)
         4  OPERATIONS DIVISION STANDARDS
            : CONFLICTS WITH XCN610-0005 CLAUSE 2-3-4             5-4-15  (10)
         5  SECTION STANDARDS
            : CONFLICTS WITH BR230-42 CLAUSE 4-1                  8-3- 1  (28)

3—3   EVALUATION OF CORRECTION FORM (FULL POINTS : 100)
           1 GRAMMAR 45 POINTS
           2 STRUCTURE 45 POINTS
           3 LOGIC OF FORM 60 POINTS
           4 LEVEL OF INTERPRETATION 70 POINTS

PERSON IN CHARGE (△△) TEL (yyyy-yyyy) ,E-mail (dddddd@ee. ffffff.co.jp)
```

FIG.13

| PHRASE IDENTIFIER | CONFLICT FLAG | CORRECTION SUGGESTION |
|---|---|---|
| 4-2-8 (1) | 0 | THIS STANDARD [95, 90, ⋯]<br>THE PRESENT STANDARD ... [5, 10, ⋯] |
| 4-2-8 (3) | 0 | FOR MANUFACTURE ... [85, ⋯]<br>FOR PRODUCTION... [15, ⋯] |
| 6-1-1 (2) | 1 | |

US 6,796,486 B2

DOCUMENT REVIEW APPARATUS, A DOCUMENT REVIEW SYSTEM, AND A COMPUTER PRODUCT

This application is a continuation of PCT/JP98/04059 filed on Sep. 10, 1998.

TECHNICAL FIELD

This invention relates to a document review apparatus and a document review system for reviewing documents by using a network. This also invention relates to a computer-readable recording medium in which programs for allowing a computer having a communication function to operate as such a document review apparatus are stored in.

BACKGROUND ART

Following recent advances in communication technology, there have been frequent attempts to process office work, performed by distributing printed materials through the post and the like, by transmitting and receiving electronic documents via a network. For example, Japanese Patent Application Laid-Open (JP-A) No. 8-147381 discloses a review work support system for electronically processing reviews and approvals, relating to financial check documents in the financial business and the like, by using a network. Furthermore, Japanese Patent Application Laid-Open (JP-A) No. 8-46637 proposes an electronic mail forward processing method for realizing monitoring of documents by electronic mail.

Moreover, Japanese Patent Application Laid-Open (JP-A) No. 7-200552 disclose a joint document creation system for creating one document by aligning a plurality of computers which are connected by a communication network.

By using the technology described in the above patent applications, various types of processes and operations can be efficiently and reliably performed. For example, there is an operation which is generally termed "document review" which is performed in manufacturing and the like. A document review is used in publishing and correcting documents and the like relating to specifications and the like, and comprises firstly creating (revising) a document to be reviewed by using a word processor or the like. Furthermore, a report describing the route and purpose for publishing (correcting) the document is created. As shown schematically in FIG. 19, copies of the report are distributed by mail to relevant departments. The departments, which the copies have been distributed to, review the contents of the copies and send their replies regarding the document review to the creator of the document (review instigator). The review instigator analyzes the received multiple replies and revises the document based on the result of this analysis, thereby producing the official document.

By applying the technology described in the above patent applications to the part of this document review where mail is used, the document review can be carried out by rapidly.

However, the system of such a constitution is nothing more than a system in which the time required for receiving written articles (documents) is electronically shortened. Therefore, there is a demand for a system which can efficiently realize document reviews.

Therefore, it is a first object of this invention to provide a document review apparatus which can construct a network system for carrying out document reviews with extreme efficiency, and a computer-readable recording medium which programs for allowing a computer to operate as the document review apparatus are stored in.

Furthermore, it is a second object of this invention to provide a document review system wherein document reviews can be carried out with extreme efficiency in a plurality of apparatuses which are connected via a network.

DISCLOSURE OF THE INVENTION

The document review apparatus according to one aspect of this invention comprises a communication unit connected to a network for performing communication with other devices; a memory unit; a determination unit which determines, based on information received from said communication unit, whether the information is information holding a review result of a reviewed form to be reviewed; a storing control unit which stores information, which has been determined by the determination unit to be information holding a review result of a reviewed form, as review result information in said memory unit; and a creating unit which creates a single review result information based on the review result information when a predetermined number of review result informations have been stored in said memory unit.

The document review apparatus according to the above-mentioned aspect has a function for collecting review result information which holds a review result relating to a reviewed form via the network, and a function for creating a single review result information from the collected review result informations. Therefore, when the document review apparatus is connected to the network, it can review documents with extreme efficiency, shortening not only the time required to receive the document which the review result is written in, but also the time required to analyze the document.

The document review apparatus according to another aspect of this invention comprises a communication unit connected to a network for performing communication with other devices; a first memory unit which stores a reviewed form which is to be reviewed by a plurality of reviewers; a second memory unit; a determination unit which determines, based on information received from said communication unit, whether the information is information holding a review result of a reviewed form to be reviewed; a storing control unit which stores information, which has been determined by the determination unit to be information holding a review result of a reviewed form, as review result information in said second memory unit; a creating unit which creates statistical data relating to the review result information when a predetermined number of review result information from the plurality of reviewers have been stored in said second memory unit; and an updating unit which updates the contents of the reviewed form stored in said first memory unit by using the statistical data created by said creating unit.

The document review apparatus according to the above-mentioned aspect has a function for collecting review result information which holds a review result relating to a reviewed form via the network, a function for creating statistical data by statistically processing the collected review result information, and a function for updating the contents of the reviewed form by using the created statistical data. Therefore, when the document review apparatus is connected to the network, it can perform extremely efficient document review, shortening not only the time required to receive a document which the review result is written in, but also the time required to analyze the document.

The document review apparatus may further comprise a notification unit which notifies the plurality of reviewers that a reviewed form to be reviewed is stored in said first memory unit; and a transmission unit which, when information having a predetermined format and comprising address information has been received by said communication unit, uses said communication unit to transmit information which corresponds to the reviewed form stored in said first memory unit to a device identified by said address information.

When the document review apparatus having this constitution is connected to the network, the document review can be completed by some of the reviewers (e.g. reviewers who are not directly involved in authorizing the contents of the reviewed form) without extracting the reviewed form through the internet. This is because the reviewers who are not directly involved in authorizing the contents of the reviewed form receive notification from the notification unit, and are able to transmit the review result information. As a result, when using the document review apparatus of this invention, the document review can be carried out with efficient use of limited network resources.

The document review apparatus may further comprise a display unit for displaying textual information, and an input unit for inputting commands. The updating unit comprises a display control unit which allows said display unit to display the contents of the reviewed form stored in said first memory unit in a format enabling an update result using statistical data created by said creating unit to be understood; and a contents updating unit which updates the contents of the reviewed form stored in said first memory unit based on a command which is input via said input unit while said display control unit is controlling the display. Moreover, in the case where the display unit is added, the document review apparatus according to the second aspect of this invention can be realized by adding a second display control unit which allows said display unit to display a graph based on the statistical data created by said creating unit.

That is, the constitution of the document review apparatus maybe such that the reviewed form is not completely revised automatically, but by dialog after confirmation from the operator. Then, to simplify the confirmation operation, the document review apparatus may be configured to display a graph showing the contents of statistical data of the review result information.

When a plurality of the document review apparatuses of this invention are connected together via a network to construct a system, it is possible to obtain a document review system wherein extremely efficient document review is performed by the document review apparatuses.

Of course, the document review apparatus according to this invention can be configured (realized) as a special apparatus, but it can also be realized by storing programs for allowing a computer to operate as a document review apparatus having the functions described above in a computer-readable recording medium.

BRIEF DESCRIPTION OF THE DRAWINGS

FIG. 1 is a schematic diagram showing the constitution of a document review system constructed by using the document review apparatus according to an embodiment of this invention;

FIG. 2 is a diagram showing a reviewer information table which is held by the document review apparatus according to the embodiment;

FIG. 3 is a diagram showing a review request form which is prepared in the document review apparatus according to this embodiment;

FIG. 4 is a diagram showing a response format which is prepared in the document review apparatus;

FIG. 5 is a flowchart showing operating procedures (as far as transmitting a document review request mail) of the document review apparatus according to this embodiment;

FIG. 6 is a diagram showing a reviewed form which is displayed on a display of a reviewer terminal and the like;

FIG. 7 is a flowchart showing an example of operating procedures performed in a reviewer terminal which has received the document review request mail;

FIG. 8 is a diagram showing a correction form file which is created in the reviewer terminal by using the reviewed form extracted from the document review apparatus;

FIG. 9 is a diagram showing a correction response form which is created in the reviewer terminal by using the response format extracted from the document review apparatus;

FIG. 13 is a diagram showing a correction required phrase table created by the document review apparatus according to this embodiment;

BEST MODE FOR CARRYING OUT THE INVENTION

Figure 10:
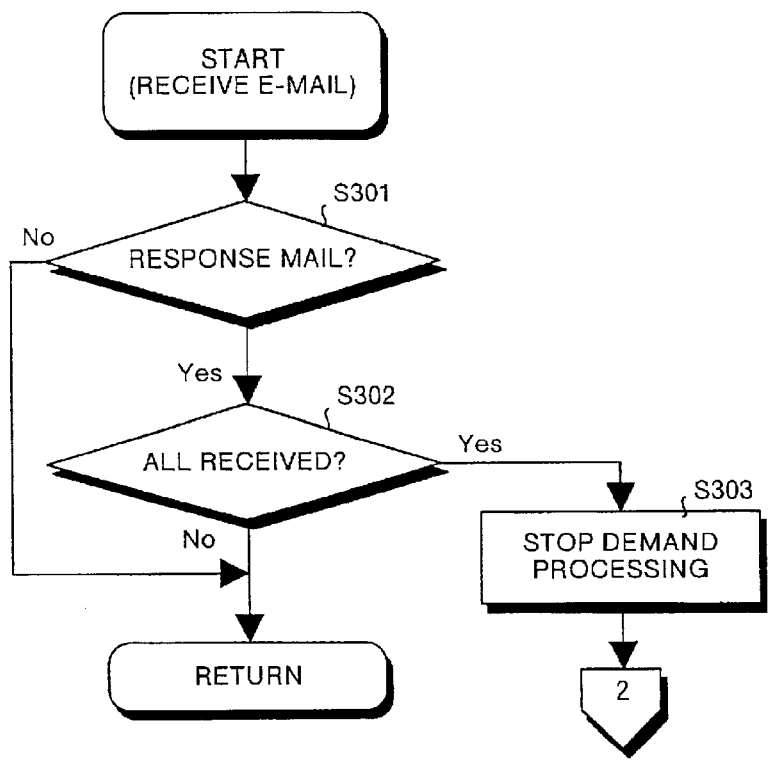
FIG. 10 is a flowchart showing operating procedures of the document review apparatus according to this embodiment in the case where an e-mail has been received during execution of document review processing.

The invention will be explained in detail based on the accompanying drawings.

The document review apparatus according to this invention is an apparatus for carrying out a document review relating to a published and corrected document such as a stipulation. As shown schematically in FIG. 1, the document review apparatus 10 according to an embodiment of this invention is connected via a network to a plurality of reviewer terminals 20, comprising terminals used by reviewers. The document review apparatus 10 comprises several programs added to a computer which can be used as a WWW server. Therefore, the hardware constitution of the apparatus will not be explained.

In using the document review apparatus 10 to review a document, the operator prepares a reviewer information table (not shown), a reviewed form, a review request form, a response format, and a demand form (not shown) in a memory apparatus 11 of the document review apparatus 10.

The reviewer information table is a table which holds information relating to the reviewer. As shown in FIG. 2, the reviewer information table sets e-mail (electronic mail) addresses and review weight classes in correspondence with the names (department name and representative name) of the reviewers (review section).

A reviewed form is an electronic document such as a published or corrected stipulation which is to be the subject of a document review. The reviewed form will be explained in more detail later. A review request form is an electronic document used as the content of a document review request mail which is sent to the reviewers. As shown in FIG. 3, the document review request form comprises a deadline and a URL (uniform resource locator). A response format is an electronic document comprising a portion showing reasons and the like for publication and correction of the reviewed form, and a portion which is used by the reviewer as a model for writing (inputting via a keyboard) the review result. FIG. 4 shows an example of the response form which is prepared. The demand form is an electronic document comprising contents of a demand mail which is sent in demand processing (explained in detail later) to a reviewer who has not responded to the review request.

The review request form, the response format, and the demand form are prepared each time a new reviewed form is generated (for each document review), but the reviewer information table is not prepared for each document review. Usually, a reviewer information table which was prepared when the document review apparatus 10 started operating is used in each document review. The operator uses what is termed "editor software" to prepare the reviewed form and the like.

After preparing the reviewed form and the like, the operator controls the document review apparatus 10 in a predetermined manner. The document review apparatus 10 detects the predetermined control, and starts the processes shown in FIGS. 5, 10 to 12, 14, and 18 (hereinafter termed "document review processing").

As shown in FIG. 5, the operator inputs the reviewed form identification information specifying the reviewed form, the deadline date, the URL, and the like, to the document review apparatus 10 (step S101). The deadline date and URL which are input in this step are the same as those written in the review request form.

Thereafter, the document review apparatus 10 appends phrase numbers to each phrase of each article comprising the reviewed form, specified by the input reviewed form identification information (step S102). Next, the document review apparatus 10 registers the reviewed form and the response format in a WWW server (the apparatus itself) so that reviewed form and the response format, which phrase numbers have been appended to, can be read by the URL input in steps S101 and S103. That is, by performing an operation (browser activation and URL input) to an apparatus comprising a web browser, a reviewed form, which phrase numbers are appended to, such as that shown in FIG. 6, and the response format, such as that shown in FIG. 3, can be displayed on the display of the apparatus. Incidentally, in FIG. 6, the numerals shown above the phrases comprising the articles are the phrase numbers appended in step S102.

Then, the document review apparatus 10 activates the demand process (step S104). The deadline date which was input in step S101 becomes information used in the demand process, as will be explained in detail later.

After the demand process has been activated, the document review apparatus 10 transmits a document review request mail (hereinafter termed simply "request mail"), comprising an e-mail of the contents of the review request form (see FIG. 3), to the head of each department by using the e-mail address which is stored in the reviewer information table (see FIG. 2) (step S105), and temporarily cancels the document review processing. That is, the document review apparatus 10 recognizes that the document review processing has been cancelled, and allows other processes to be executed.

When the reviewer terminal 20 receives this request mail, the reviewer uses the software (e.g. browser software, mailer software) which is installed in the reviewer terminal 20 to perform an operation for creating a response mail to be sent in response to the document review apparatus 10.

This operation is, for example, performed by the procedures shown in FIG. 7.

That is, the reviewer confirms the existence of the form (reviewed form) which must be reviewed after receipt of the request mail. Using the URL written in the request mail, the reviewer refers to the contents of the reviewed form and the like stored in the document review apparatus 10 and reviews the contents thereof (step S201). Then, when it has been determined that correction is necessary (step S202: YES), the reviewer downloads the pages of the reviewed form which requires correction and the response format (step S203), and creates a correction form file which sets the original and the corrections (step S204).

The document review apparatus 10 treats a file such as that shown in FIG. 8 as a correction form file. For this reason, the reviewer extracts the required data (the original form which requires correction and period numbers including the original) from the page data of the downloaded reviewed form. Then, the reviewer creates the correction form file by adding the correction form, comprising suggestions for corrections of phrase units, to the extracted data.

Furthermore, based on the response format, the reviewer selects correction required, and creates a response form which sets the required information (step S205). That is, the reviewer creates a response form in which need for correction is "2", such as that shown in FIG. 9, by using the later half of the response format shown in FIG. 4. Furthermore, when there are stipulations to be referred to when reading the document to be reviewed in addition to the stipulations which are written in the reviewed form relevant stipulation box (see FIG. 6), identification information for these is entered into the "reference stipulations" box. Moreover, when entries which conflict with ideas and stipulations are discovered in the reviewed form, phrase identifiers showing the existence of these entries and the names of the conflicting stipulations (clause number and the like) are written in the "conflicting stipulations" box. Furthermore, the reviewer writes his own evaluation (marked out of 100) of the corrections in the corrected form file in the "evaluation of corrected form" box.

Then, the reviewer transmits the response form which the information have been entered in as a file appended to an e-mail to the review request source (step S206), whereby the operation ends.

On the other hand, when the result of the review is that no correction is required (i.e. the original is adequate) (step S202: Yes), the reviewer downloads the response format (step S207) and creates a response form in which "correction not required" has been selected (by entering "1" in the correction required? box) by using the response format (step S208). Then, the reviewer e-mails the response form to the review request source (step S209), and the operation ends.

Incidentally, in a system using the document review apparatus 10 according to this embodiment, the operation of sending the response mail is performed by the reviewer. Therefore, the operating procedures of the reviewer are not limited to those shown in the diagrams. For example, the reviewer may carry out the review after downloading the reviewed form and the like. Alternatively, he may look at the response format (looking only at the portion which shows reasons for the publication and correction of the reviewed form) in step S101, and execute the processes from step S207 onwards.

Subsequently, the operations of the document review apparatus 10 after sending the request mail and up to the completion of collecting the response mail will be explained.

As already explained, after sending the request mail, the document review apparatus 10 is in a state of having confirmed that the document review processing is cancelled. When a receipt of e-mail is detected in this state, the document review apparatus 10 determines whether that e-mail is a response mail (step S301). The document review apparatus 10 determines whether the e-mail is a response mail by checking the compatibility (whether the names match, etc.) between the content of the e-mail and the model contained in the response format.

When the document review apparatus 10 has determined that the received e-mail is not a response mail (step S301: Yes), the document review apparatus 10 returns to a state of being able to execute other processes. On the other hand, when it has been determined that the e-mail is a response mail (step S301: No), the document review apparatus 10 determines whether all the response mails have been received (step S302). That is, it is determined whether response mails have been obtained from all the reviewers whom request mails were sent to.

Then, when all the response mails have not yet been received (step S302: No), the document review apparatus 10 returns to a state of being able to execute other processes. On the other hand, when all the response mails have been received (step S302: Yes), the document review apparatus 10 performs a process to stop the demand processing (step S303), and starts the processing shown in FIG. 12.

Here, the demand processing will be explained.

Figure 11:
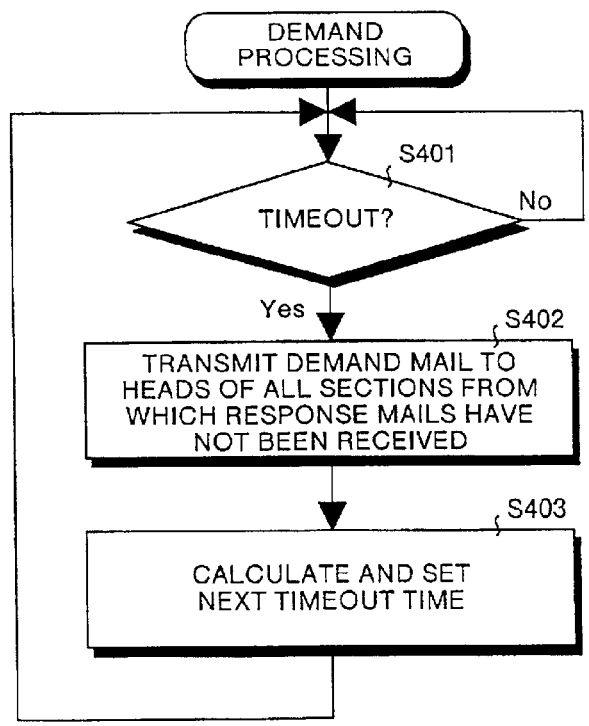
FIG. 11 is a flowchart showing demand processing performed as part of the document review processing.

As shown in FIG. 11, the demand processing comprises transmitting a demand mail (step S402) to the department chiefs from whom response mails have not been received at timeout (step S401: Yes), and resetting the time of the next timeout (step S403).

When the demand process is activated in step S104 (see FIG. 5), the document review apparatus 10 specifies the deadline date, which was input in step S101, as the time of the timeout. Furthermore, the time of the timeout is calculated in step S403 by adding a predetermined time (e.g. 24 hours) to the time of the timeout which is presently set. As described above, the demand processing is stopped when the response mails have been completely collected. Consequently, when there is a reviewer who has not sent his response mail even though the deadline has expired, the document review apparatus 10 repeats the demand processing until the response mail is obtained.

Subsequently, procedures for processing the collected responses of the document review apparatus 10 will be explained.

The document review apparatus 10 processes the responses by creating information (a type of database) in which the information written in the response is statistically arranged, and by revising the original based on the created information.

To begin with, the operation of the document review apparatus 10 in carrying out the first of these processes will be explained based on FIG. 12.

Figure 12:
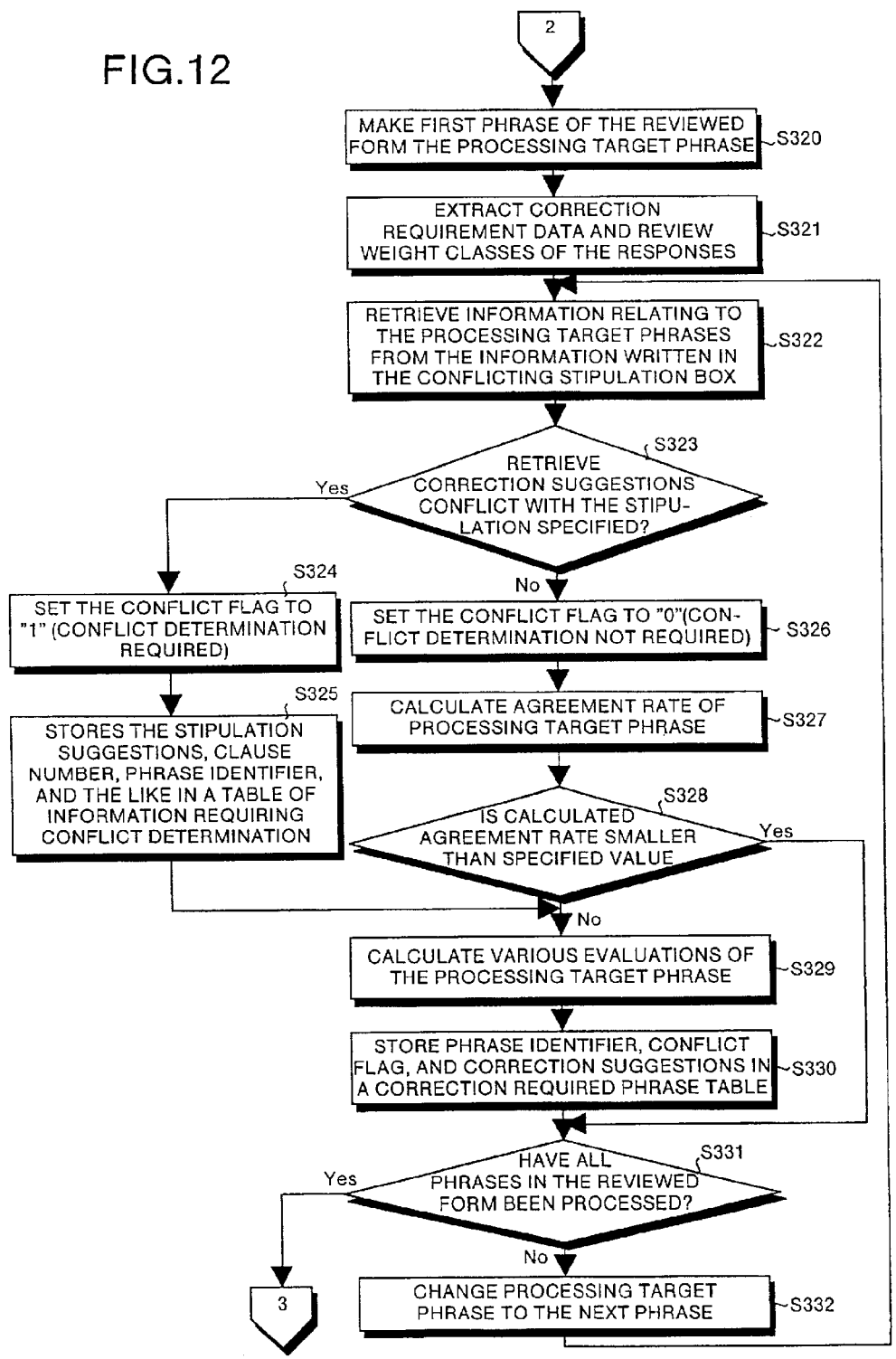
FIG. 12 is a continuation of the flowchart of FIG. 10 and shows operating procedures of the document review apparatus according to this embodiment.

When response mails have been obtained from all the reviewer whom request mails were sent to (see FIG. 10), the document review apparatus 10 deems the first phrase of the reviewed form to be a processing target phrase, as shown in FIG. 12 (step S320). For example, when the reviewed form was the one shown in FIG. 6, the document review apparatus 10 deems the phrase "Electronic" of the first paragraph having the phrase number (1) to be the processing target phrase.

Then, the document review apparatus 10 reads the correction requirement data, information entered in the relevant stipulation box, and evaluation written in the evaluation box, from each response. In addition, the document review apparatus 10 reads the review weight classes allocated to the responses (step S321). Subsequently, the document review apparatus 10 retrieves information relating to the processing target phrases from the responses which indicate that correction is required (correction requirement data is "2") (step S322). That is, the document review apparatus 10 retrieves information relating to the processing target phrases from the information written in the conflicting stipulation box, and also retrieves textual information (correction suggestions) provided in correspondence with the processing target phrase from the information written in the correction box of the correction form file.

When it is not possible to retrieve information indicating that the processing target phrase conflicts with the stipulations and the like (step S323: No), the document review apparatus 10 sets the conflict flag to "0" (step S326) and calculates an agreement rate (explained in detail later) for the processing target phrase (step S327). Then, the document review apparatus 10 determines the sizes of the calculated agreement rate and a predetermined specification value. When the calculated agreement rate is smaller than the specified value (step S328: No), the document review apparatus 10 calculates various evaluations relating to the correction suggestions in the processing target phrase (step S329). The information relating to the processing target phrase which was extracted in the processing from step S322 onwards is stored in a correction required phrase table (step S330). Thereafter, the document review apparatus 10 determines whether all the phrases in the reviewed form have been processed. When not all have been processed (step S331: No), the document review apparatus 10 changes the processing target phrase to the next phrase (step S332) and returns to step S322 to start processing of the new processing target phrase.

Here, the operations of steps S326 to 330 will be explained more specifically.

In this invention, average values are obtained by adding weights corresponding to a review weight class to the numerical values of the information written in the responses, and are used as the agreement rate and the various evaluations. That is, in this invention, numerical values at an interval of "1" to "0.2" are allocated to the review weight classes "A" to "E". In calculating an evaluation value (including the agreement rate) from the values $x_1, x_2, \ldots, x_n$, which are specified by the reviewers 1, 2, . . . , n, the evaluation value X is calculated by $(\alpha_1 \cdot x_1 + \alpha_2 \cdot x_2 + \ldots + \alpha_n \cdot x_n)/(\alpha_1 + \alpha_2 + \ldots + \alpha_n)$ using numerical values $\alpha_1, \alpha_2, \ldots,$ $\alpha_n$, which correspond to the review weight class allocated to the reviewer n.

For example, the calculation of the agreement rate in step S327 is made by using "100" as an $_x$ corresponding to the response showing the correction suggestion for the processing target phrase, and "0" as an $_x$ corresponding to responses (comprising all responses which deem correction to be unnecessary and several responses which deem correction to be necessary) not showing any correction suggestions for the processing target phrase. A processing target phrase which has an agreement rate calculated in this way which is greater than a predetermined specified value (e.g. 90) is not revised. Therefore, the steps S329 and 330 of calculating and storing the information using in revision are not executed.

Furthermore, the evaluation value calculated in step S329 is divided into information used in selecting one correction suggestion from the plurality of correction suggestions for the processing target phrase in the document review apparatus 10, and information used in allowing the operator to visually confirm that the selection is correct.

The former information comprises an agreement percentage (weight allocation ratio) for each correction suggestion for the processing target phrase, and the latter information comprises evaluation values (average weight allocations) and the like from grammatical, structural, logical, and interpretative points of view of the correction suggestions.

The specific procedures for using these informations (agreement percentage and evaluation values) will be explained later. The agreement percentage is calculated by a procedure similar to that in calculating the agreement rate. For example, in a case where there are three types of correction suggestions (correction suggestions A, B, and C), the agreement percentage for correction suggestion A is calculated by using "100" as X for the response showing correction suggestion A, and using "0" as X for the response showing correction suggestions B and C. The agreement percentages for correction suggestions B and C are calculated by similar procedures.

Furthermore, evaluation values considering the grammar and the like of the correction suggestions are calculated by similar procedures. For example, a grammatical evaluation value for correction suggestion A is calculated by using points for grammar and the review weight class of each of the responses which the correction suggestion A is written in, and a grammatical evaluation value for the correction suggestion B is calculated by using points for grammar and the review weight class of each of the responses which the correction suggestion B is written in. An evaluation value for the grammar of correction suggestion C is calculated by using points for grammar and the review weight class of each of the responses which the correction suggestion C is written in. Structural, logical, and interpretative evaluations of the correction suggestions are made by similar calculations.

Furthermore, responses in which the evaluation points for the correction form are between 0 to 20, 21 to 40, 41 to 60, 61 to 80, and 81 to 100 are deemed to be "extremely poor", "poor", "normal", "good", and "extremely good" responses respectively, and weight allocations of responses classified by evaluation are determined for groups of responses showing the same correction suggestions.

Then, in step S330, the retrieved correction suggestion and the calculated evaluation value are stored in correspondence with the processing target phrases, so that they can be read immediately when required. More specifically, as shown in FIG. 13, the correction required phrase table enables the category and extracted conflict flags of the processing target phrase to be stored in correspondence with phrase identifiers, comprising period numbers and phrase numbers, for each processing target phrase. As shown schematically in FIG. 13, the correction required phrase table enables the evaluation values (the numerical values shown inside [ ] brackets) to be stored for each processing target phrase.

Returning to FIG. 12, the explanation of the operation of the document review apparatus 10 will be continued.

When information which shows that the processing target phrase conflicts with the stipulation and the like (step S323: Yes), the document review apparatus 10 sets the conflict flag to "1" (step S324) and stores the stipulation name, clause number, phrase identifier, and the like, which are included in the response, in a table of information requiring conflict determination (step S325). The table of information requiring conflict determination is merely a table for storing the contents of the "conflict stipulation" boxes of a plurality of responses so that they do not overlap, and it will not be explained in detail. The document review apparatus 10 then shifts to step S329, and performs the same process as when the agreement rate was below the specified value.

That is, when a conflict with a stipulation or the like is indicated, it is preferable to confirm whether there actually is a conflict, even is the agreement rate has a high value. To achieve this, when a conflict with a stipulation or the like is indicated, the document review apparatus 10 skips to step S328.

When a conflict with a stipulation or the like is indicated but no correction suggestion is shown (a correction suggestion for the processing target phrase has not been retrieved in step S322), no evaluation value is calculated in step S329. In step S330, the conflict flag in the correction required phrase table is set to "1" and the data which no correction suggestion are stored in are stored (registered) (see FIG. 13).

When the above processing has been carried out for all the phrases which comprise the reviewed form (step S348: Yes), the document review apparatus 10 ends the processing shown in FIG. 13. Then, the document review apparatus 10 starts the processing shown in FIG. 14.

Figure 14:
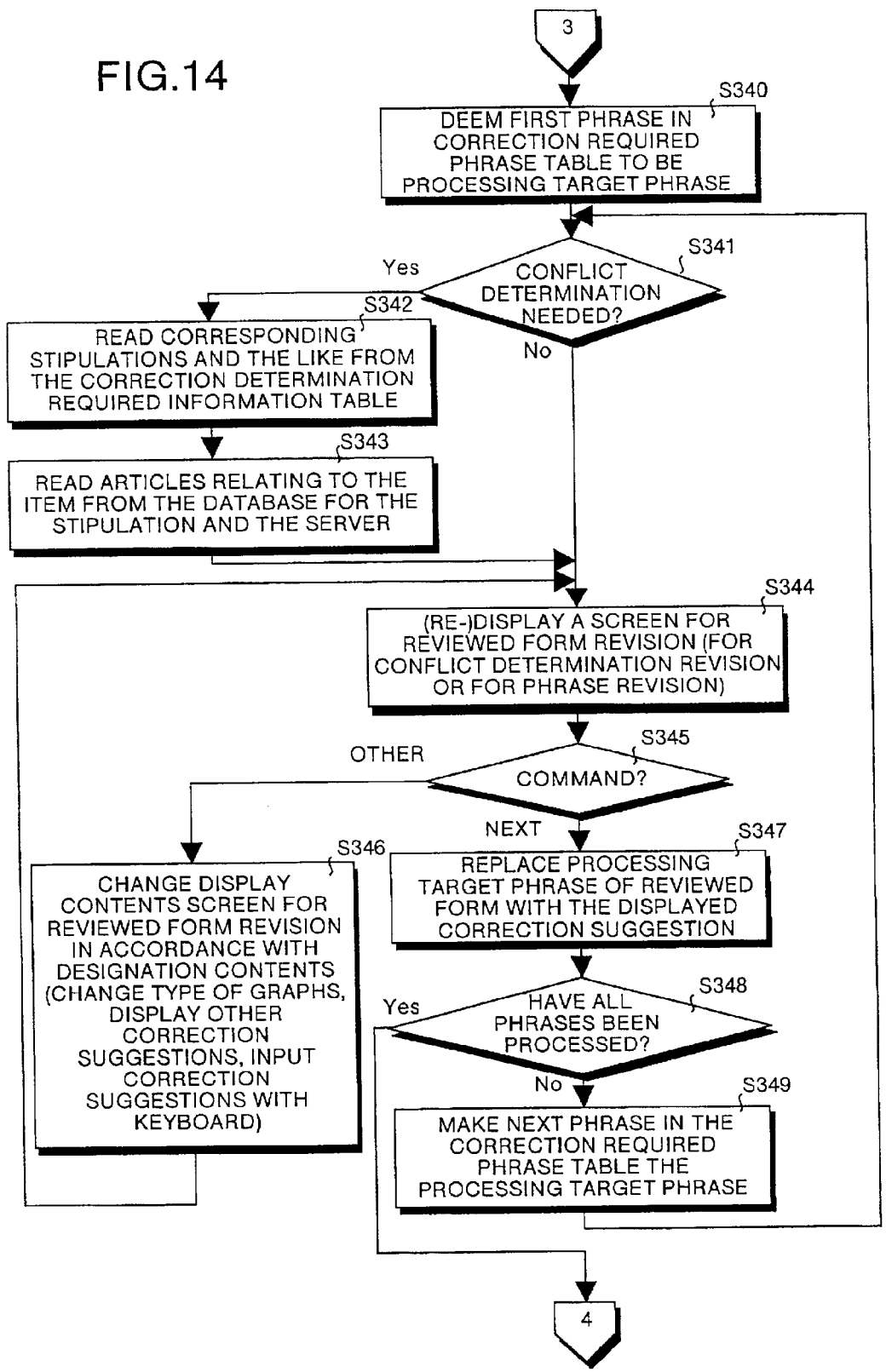
FIG. 14 is a continuation of the flowchart of FIG. 12 and shows operating procedures of the document review apparatus according to this embodiment.

Writing in the flowchart is omitted here, but the processing shown in FIG. 14 starts when the operator performs a predetermined control. That is, when the processing of FIG. 12 is complete, the document review apparatus 10 displays information representing this fact on its own display. The operator confirms from the information that the collection of the responses is complete, and inputs a predetermined command. When the input command is detected, the document review apparatus 10 starts the processing shown in FIG. 14 and deems the first phrase in the correction required phrase table to be the processing target phrase (step S340). Then, the document review apparatus 10 determines whether the processing target phrase requires a conflict determination, based on the conflict flag stored in the correction required phrase table (step S341).

In the case where the processing target phrase does not require a conflict determination (step S341: No), the document review apparatus 10 displays a screen for reviewed form revision on its display (step S344). On the other hand, in the case where the processing target phrase requires a conflict determination (step S341: Yes), the document review apparatus 10 reads the stipulation name, clause number, and the like, which are stored in correspondence with the phrase identifier of the processing target phrase, from the table of information requiring conflict determination (step S342) Subsequently, the document review apparatus 10 reads the contents of articles and the like relating to items, identified by an item number or the like, from the server or a database relating to the stipulation which has been identified by the read stipulation name (step S343). Then, the screen for reviewed form revision is displayed by using the information which has been read (step S344).

The screen for reviewed form revision displayed in step S344 comprises a screen for phrase revision, which is a screen for reviewed form revision displayed in the display when step S341 has branch to the NO side, and a screen for conflict determination revision, which is a screen for reviewed form revision displayed in the display when step S341 has branch to the YES side. The screen for phrase revision and the screen for conflict determination revision both have regions called reviewed form revision regions. However, the screen for phrase revision also has a region (a display region of the display other than the reviewed form revision region) which a graph depicting the evaluation value is displayed in, whereas the screen for conflict determination revision displays contents of the conflict article and the like which was read in step S343 in the region corresponding to the graph display region.

Figure 15:
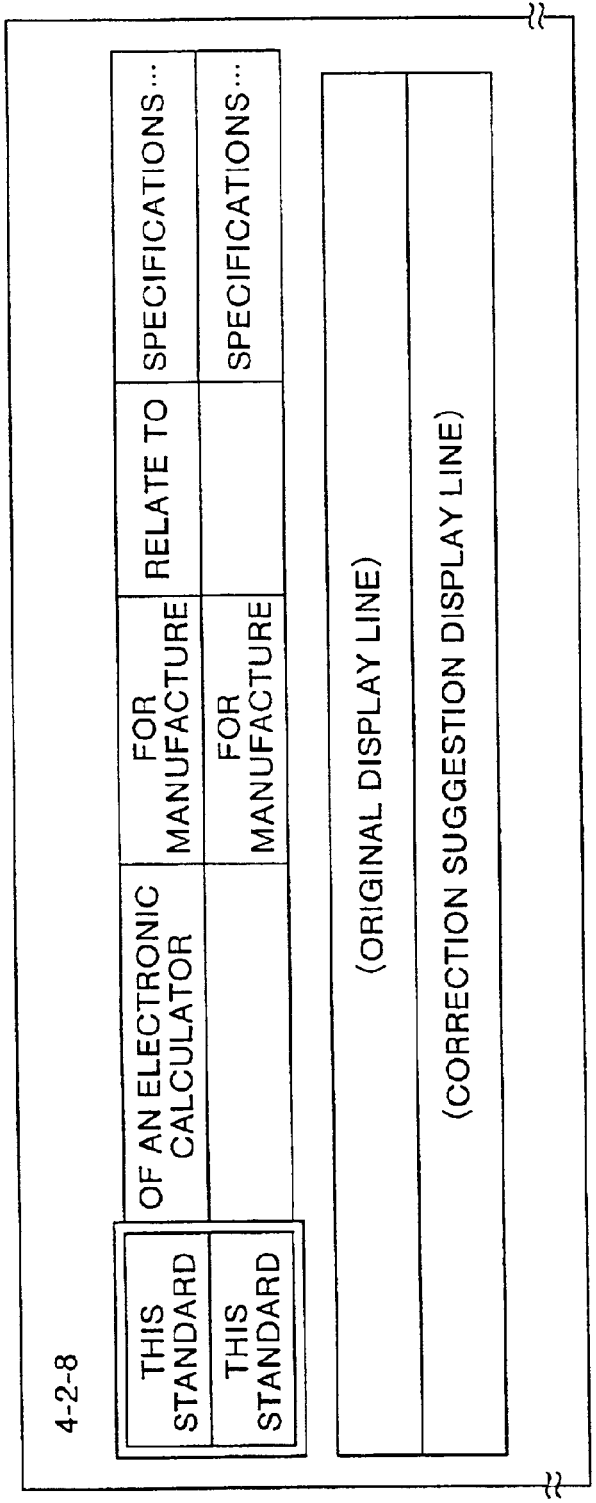
FIG. 15 is a diagram showing a constituent element of a screen for reviewed form revision, which is displayed by the document review apparatus of this embodiment, and comprises a reviewed form revision region.

As shown schematically in FIG. 15, the reviewed form revision region comprises several pairs of an original display line which shows the phrase breaks in the original, and a correction suggestion display line which shows the corresponding correction suggestions therefor. The size of the region can be changed.

In displaying this reviewed form revision region, the document review apparatus 10 extracts information (text rows) relating to the form comprising the processing target phrase from the reviewed form, and displays the information on the original display line. The document review apparatus 10 extracts correction suggestions for a group of phrases displayed on the original display line from the correction required phrase table. For phrases which have a plurality of correction suggestions, the correction suggestion having the largest calculated agreement percentage is extracted. Then, the extract correction suggestions are displayed inside the correction suggestion display line below the phrases and in positions corresponding thereto. To enable the operator to confirm the processing target phrases, the document review apparatus 10 displays the processing target phrases and their correction suggestions at that point in a format different from the other portions (in FIG. 15, the processing target phrases are displayed inside double-lined boxes).

Figure 16:
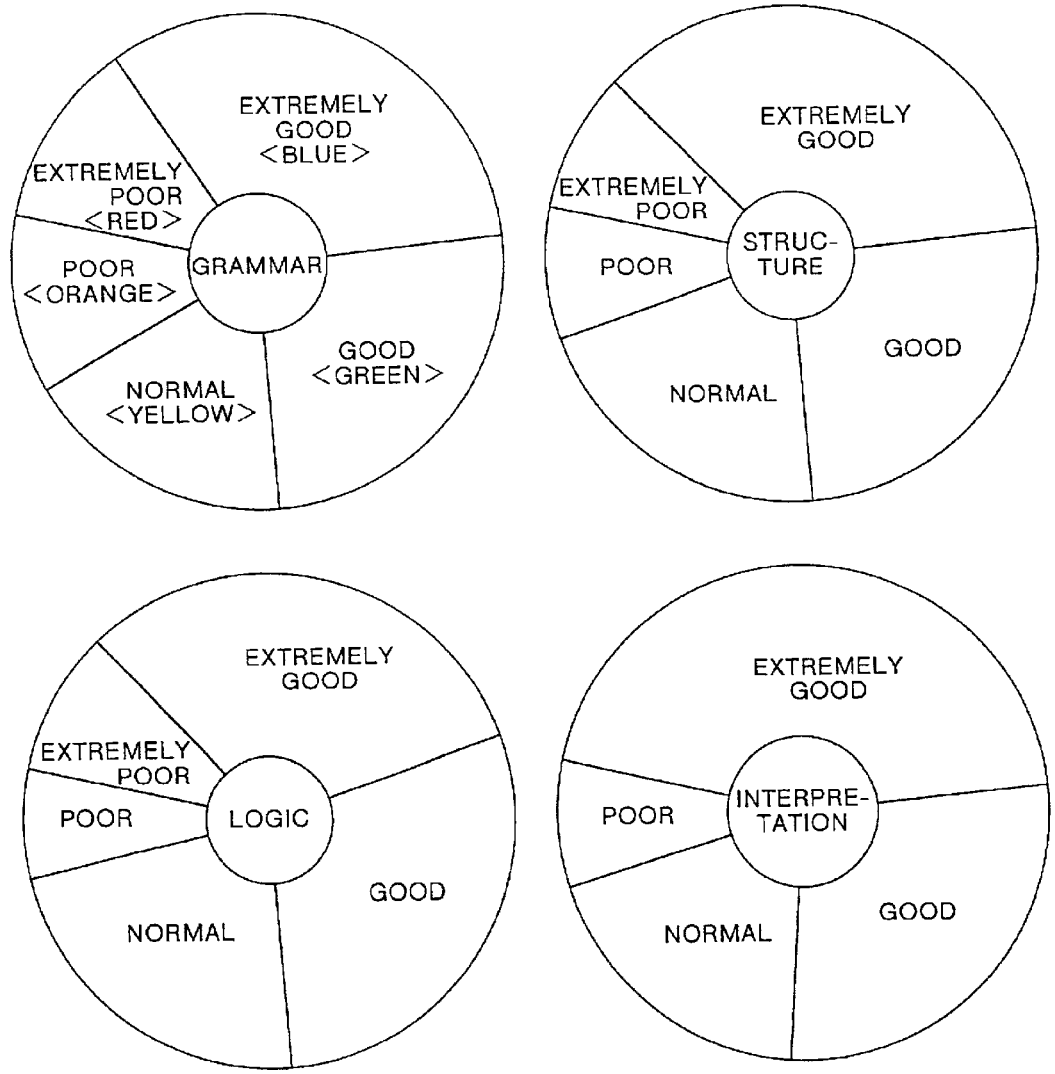
FIG. 16 is a graph used as a constituent element of the screen for reviewed form revision which is displayed by the document review apparatus of this embodiment.
Figure 17:
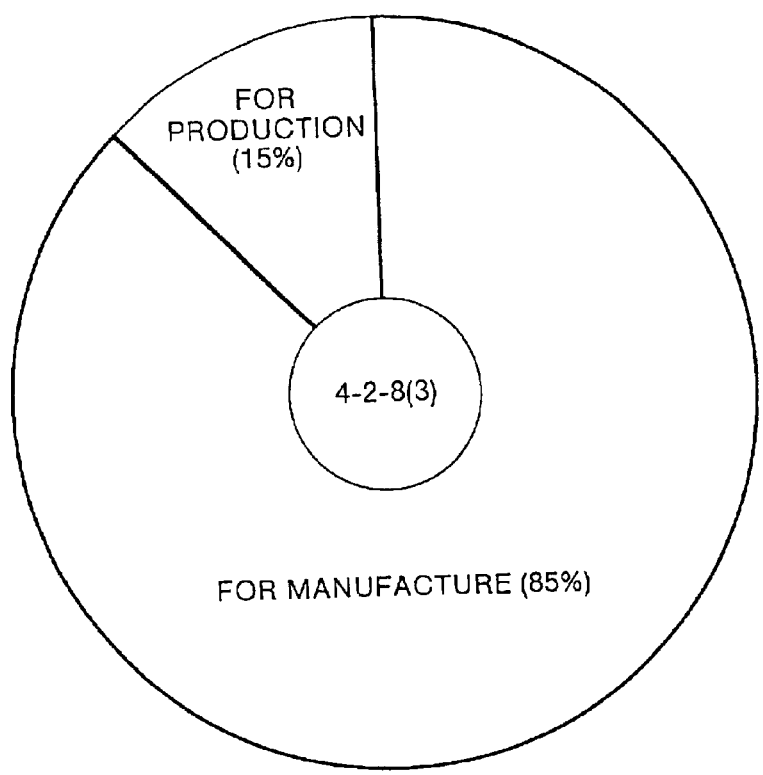
FIG. 17 is a graph used as a constituent element of the screen for reviewed form revision which is displayed by the document review apparatus of this embodiment.
Figure 18:
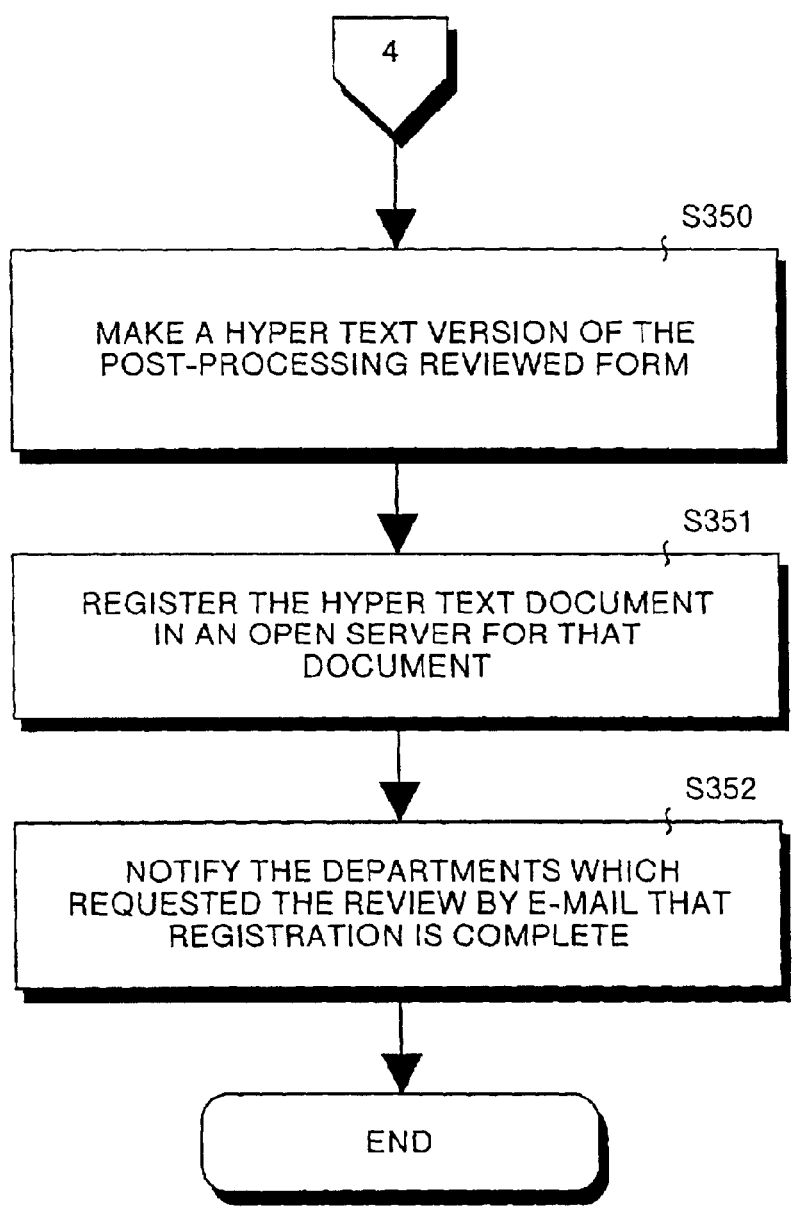
FIG. 18 is a continuation of the flowchart of FIG. 14, and shows operating procedures of the document review apparatus according to this embodiment.
Figure 19:
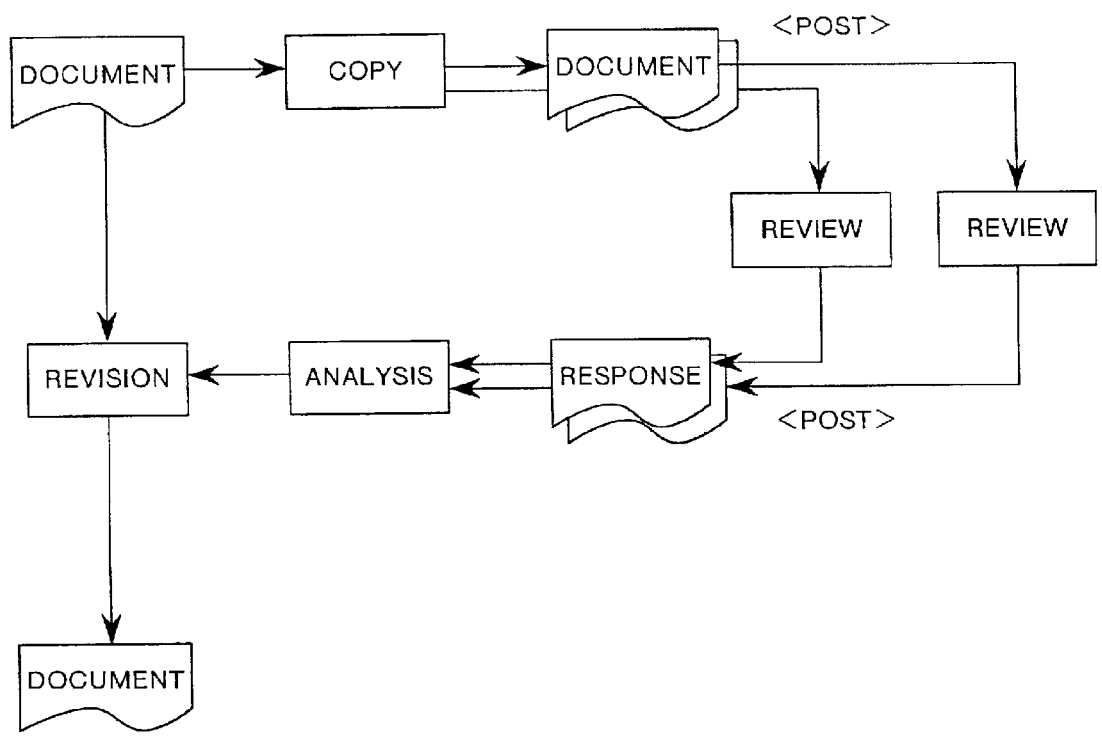
FIG. 19 is a schematic diagram showing contents of a document review operation.

Then, when the screen to be displayed is the screen for phrase revision, the graphs which are specified for display at that point, for example, the graphs shown in FIG. 16 and the graph shown in FIG. 17, are displayed in the graph display region together with the reviewed form revision region.

The round graphs shown in FIG. 16 show the weight allocation ratio of the number of responses of the evaluations in the case where the evaluation scores from four points of view, such as grammar and the like, written in the responses proposing the correction suggestions for the processing target phrase at that point, are classified into five evaluations. Furthermore, the graph shown in FIG. 17 is a round graph showing agreement percentages of correction suggestions. The correction suggestions proposed for the phrase specified by the phrase identifier "4-2-8(3)" are "for production" and "for manufacture", and the agreement percentage for "for manufacture" is 85%.

In this way, after displaying the screen for reviewed form revision in accordance with circumstances, the document review apparatus 10 shifts to standby for a command input by the operator (step S345).

The commands which can be input in this step include commands to change the type and number of graphs displayed, commands to change the displayed correction suggestions, and the like. The document review apparatus 10 executes processing (step S346) in compliance with the input command. For example, when a change of the displayed correction suggestion has been specified, the correction suggestion for the processing target phrase displayed in the correction suggestion display line is changed to another correction suggestion which is stored in correspondence with the processing target phrase in the correction required phrase table. When the document review apparatus 10 is displaying graphs such as those shown in FIG. 16 (graphs other than those which do not require changes when the processing target phrases are the same, even when the displayed correction suggestions change, {e.g. the graph of FIG. 17}), the display contents of the graph are changed to match the newly displayed correction suggestion. Furthermore, the document review apparatus 10 can receive a command to display tables instead of graphs, and a command to display information relating to the responder together with the graph or independently (the abovementioned evaluation values considering grammar and the like of the correction suggestions are used in this manner). Moreover, a function is provided for inputting the correction suggestions from a keyboard. In the case where no correction suggestions are proposed, the reviewed form is revised by using this function.

Then, when a predetermined command has been detected (step S345: Next), the document review apparatus 10 determines that the correction suggestion for the processing target phrase which is being displayed at that point is good, and performs processing to replace the processing target phrase of the reviewed form with the displayed correction suggestion (step S347). Subsequently, the document review apparatus 10 determines whether all phrases have been processed, and when processing is not complete (step S348: No), re-executes the processing from step S341 with the next phrase in the correction required phrase table as the processing target phrase (step S349).

The document review apparatus 10 repeats this process, and when all the phrases have been processed (step S348: Yes), makes a hyper text version of the reviewed form which has been processed (step S350) and registers the hyper text document in an open server for that document (step S351). The open server may be the document review apparatus 10 itself, or another apparatus which is connected thereto by a network. Then, the document review apparatus 10 notifies the departments which requested the review by e-mail that registration is complete, whereby the document review processing ends.

In this way, the document review apparatus 10 according to this embodiment has a function for collecting review results comprising correction suggestions for a reviewed form via a network, and a function for statistically processing the collected review results, finding the most promising correction suggestions, and displaying them to the operator. Therefore, when the document review apparatus 10 is connected to a network, it is capable of performing efficient document review with very little effort.

The document review apparatus 10 according to this embodiment can be modified in various ways. For example, the document review apparatus 10 can be modified so as to select the first display correction suggestion based not on the agreement percentage, but on the size of the evaluation value considering the grammar and the like of the correction suggestion. Furthermore, the document review apparatus 10 may be modified to transmit the reviewed form when transmitting the request mail. However, when there is a reviewer who can respond without reading the reviewed form, the document review apparatus 10 should preferably be configured according to the embodiment described above. This is in order to prevent wasteful use of network resources.

Further, although the system (FIG. 1) used in the explanation of the document review apparatus 10 uses only one document review apparatus 10, a plurality of document review apparatuses 10 may of course be connected to the network. According to such a system constitution, the system can efficiently carry out document review in document review apparatuses which are provided in distantly separate locations.

Industrial Applicability

As described above, the document review apparatus according to this invention can be used to construct a system capable of performing efficient document review. Furthermore, the document review system according to this invention can be used for efficient document review in general businesses where there are multiple offices in distantly separate locations. Moreover, the computer-readable recording medium according to this invention can be used for realizing such a document review apparatus in a computer.

What is claimed is:

1. A document review apparatus comprising:
   a communication unit connected to a network and performing communication with other devices;
   a memory unit which stores a reviewed form, a review request form, response forms, and a demand form, each response form including a portion used as a model for writing a review result, the portion including stipulations related to the reviewed form;
   a determination unit which determines, based on information received from said communication unit in response to the review request form, whether the information is the response forms as critiques with critique instructions, including corrections and/or suggested changes, relating to contents of the reviewed form critiqued by reviewers;
   a storing control unit storing the response form critiques, as collected critiques in said memory unit; and
   a creating unit generating a single critique analysis based on the collected critiques when a predetermined number of the response form critiques have been stored in said memory units,
   wherein the communication unit transmits a demand email when one of the response forms is not received at a specified timeout in response to the review request form, and
   wherein the creating unit generating of the single critique analysis comprises processing, based upon the received response form critiques, each target phrase in the reviewed form, and when a conflict between a target phrase and the stipulations in the response form critiques is indicated by the reviewers as a correction and/or a suggested change, skipping a calculation of an agreement rate and calculating evaluations regarding the correction and/or the suggested change in the target phrase.

2. The document review apparatus according to claim 1, wherein
   the review request form comprises reviewer information, deadline information, and form storage information, and
   the reviewed form comprises target phrases to be critiqued and stipulations as relevant information to the target phrases.

3. The document review apparatus according to claim 2, wherein phrase numbers are appended to the target phrases to each target phrase to be critiqued by the phrase number in the response forms.

4. A document review apparatus comprising:
   a communication unit connected to a network and performing communication with other devices;
   a first memory unit which stores a reviewed form which is to be critiqued by a plurality of reviewers, a review request form, response forms, and a demand form, each response form including a portion used as a model for writing a review result, the portion including stipulations related to the reviewed form;
   a second memory unit;
   a determination unit which determines, based on information received from said communication unit in response to the review request form, whether the information is the response forms as critiques with critique instructions, including corrections and/or suggested changes, relating to contents of the stored reviewed form critiqued by the reviewers;
   a storing control unit storing the response form critiques, as collected critiques in said second memory unit;
   a creating unit generating statistical data relating to the collected critiques when a predetermined number of the response form critiques from the plurality of reviewers have been stored in said second memory unit; and
   an updating unit which updates the contents of the reviewed form stored in said first memory unit by using the statistical data created by said creating unit,
   wherein the communication unit transmits a demand email when one of the response forms is not received at a specified timeout in response to the review request form, and
   wherein the creating unit generating of the single critique analysis comprises processing, based upon the received response form critiques, each target phrase in the reviewed form, and when a conflict between a target phrase and the stipulations in the response form critiques is indicated by the reviewers as a correction and/or a suggested change, skipping a calculation of an agreement rate and calculating evaluations regarding the correction and/or the suggested change in the target phrase.

5. The document review apparatus according to claim 4, further comprising:
   a notification unit which notifies the plurality of reviewers that the reviewed form to be critiqued is stored in said first memory unit; and
   a transmission unit which, when information having a predetermined format and comprising address information has been received by said communication unit, uses said communication unit to transmit information which corresponds to the reviewed form stored in said first memory unit to a device identified by said address information.

6. The document review apparatus according to claim 4, further comprising:

a display unit displaying textual information; and
an input unit inputting commands, wherein
said updating unit including,
a display control unit which allows said display unit to display the contents of the stored reviewed form in said first memory unit in a format enabling an update result using the statistical data created by said creating unit to be understood; and
a contents updating unit which updates the contents of the stored reviewed form in said first memory unit based on a command which is input via said input unit while said display control unit is displaying the contents of the stored reviewed form including the update result using the statistical data.

7. The document review apparatus according to claim 6, further comprising:

a second display control unit which allows said display unit to display a graph based on the statistical data created by said creating unit.

8. A document review system comprising:

a plurality of document review apparatuses; and
a network which connects said plurality of document review apparatuses, wherein each document review apparatus comprises,
a communication unit connected to a network and performing communication with other devices;
a memory unit which stores a reviewed form to be critiqued by a plurality of reviewers, a review request form, response forms, and a demand form, each response form including a portion used as a model for writing a review result, the portion including stipulations related to the reviewed form;
a determination unit which determines, based on information received from said communication unit in response to the review request form, whether the information is the response forms as critiques with critique instructions, including corrections and/or suggested changes, relating to contents of the reviewed form critiqued by reviewers;
a storing control unit storing the response form critiques, as collected critiques in said memory unit; and
a creating unit generating a single critique analysis based on the collected critiques when a predetermined number of the response form critiques have been stored in said memory unit,
wherein the communication unit transmits a demand email when one of the response forms is not received at a specified timeout in response to the review request form, and
wherein the creating unit generating of the single critique analysis comprises processing, based upon the received response form critiques, each target phrase in the reviewed form, and when a conflict between a target phrase and the stipulations in the response form critiques is indicated by the reviewers as a correction and/or a suggested change, skipping a calculation of an agreement rate and calculating evaluations regarding the correction and/or the suggested change in the target phrase.

9. A document review system comprising:

a plurality of document review apparatuses; and
a network which connects said plurality of document review apparatuses, wherein each document review apparatus comprises,
a communication unit connected to a network and performing communication with other devices;
a first memory unit which stores a reviewed form which is to be critiqued by a plurality of reviewers, a review request form, response forms, and a demand form, each response form including a portion used as a model for writing a review result, the portion including stipulations related to the reviewed form;
a second memory unit;
a determination unit which determines, based on information received from said communication unit in response to the review request form, whether the information is the response forms as critiques with critique instructions, including corrections and/or suggested changes, relating to contents of the stored reviewed form critiqued by the reviewers;
a storing control unit storing the response form critiques, as collected critiques in said second memory unit;
a creating unit generating statistical data relating to the collected critiques when a predetermined number of the response form critiques from the plurality of reviewers have been stored in said second memory unit; and
an updating unit which updates the contents of the reviewed form stored in said first memory unit by using the statistical data created by said creating unit,
wherein the communication unit transmits a demand email when one of the response forms is not received at a specified timeout in response to the review request form, and
wherein the creating unit generating of the single critique analysis comprises processing, based upon the received response form critiques, each target phrase in the reviewed form, and when a conflict between a target phrase and the stipulations in the response form critiques is indicated by the reviewers as a correction and/or a suggested change, skipping a calculation of an agreement rate and calculating evaluations regarding the correction and/or the suggested change in the target phrase.

10. A computer-readable recording medium which stores programs allowing a computer to operate as a document review apparatus according to a process, comprising:

performing communication with other devices;
storing a reviewed form to be critiqued by a plurality of reviewers, a review request form, response forms, and a demand form, each response form including a portion used as a model for writing a review result, the portion including stipulations related to the reviewed form;
determining, based on information received from said communication unit in response to the review request form, whether the information is the response forms as critiques with critique instructions, including corrections and/or suggested changes, relating to contents the reviewed form critiqued by reviewers;
storing the response form critiques, as collected critiques;
generating a single critique analysis based on the collected critiques when a predetermined number of the response form critiques have been stored; and
transmitting a demand email when one of the response forms is not received at a specified timeout in response to the review request form,
wherein the generating of the single critique analysis comprises processing, based upon the received response form critiques, each target phrase in the reviewed form, and when a conflict between a target phrase and the stipulations in the response form critiques is indicated by the reviewers as a correction and/or a suggested change, skipping a calculation of an agreement rate and calculating evaluations regarding the correction and/or the suggested change in the target phrase.

11. A computer-readable recording medium which stores programs allowing a computer to operate as a document review apparatus, according to a process comprising:

storing a reviewed form to be critiqued by a plurality of reviewers, a review request form, response forms, and a demand form, each response form including a portion used as a model for writing a review result, the portion including stipulations related to the reviewed form;

determining, based on information received from said communication unit in response to the review request form, whether the information is the response forms as critiques with critique instructions, including corrections and/or suggested changes, relating to contents of the stored reviewed form critiqued by the reviewers;

storing the critiques, as collected critiques;

creating statistical data relating to the collected critiques when a predetermined number of the response form critiques from the plurality of reviewers have been stored in said second memory unit;

updating the contents of the stored reviewed form using the created statistical data; and transmitting a demand email when one of the response forms is not received at a specified timeout in response to the review request form, wherein the generating of the single critique analysis comprises processing, based upon the received response form critiques, each target phrase in the reviewed form, and when a conflict between a target phrase and the stipulations in the response form critiques is indicated by the reviewers as a correction and/or a suggested change, skipping a calculation of an agreement rate and calculating evaluations regarding the correction and/or the suggested change in the target phrase.

12. A computer system, comprising:

a programmed processor controlling the computer system according to a process comprising:

storing a reviewed form to be critiqued by a plurality of reviewers, a review request form, response forms, and a demand form, each response form including a portion used as a model for writing a review result, the portion including stipulations related to the reviewed form;

determining, based on information received from said communication unit in response to the review request form, whether the information is the response forms as critiques with critique instructions, including corrections and/or suggested changes, relating to contents of the stored reviewed form critiqued by the reviewers;

storing the critiques, as collected critiques;

creating statistical data relating to the collected critiques when a predetermined number of the response form critiques from the plurality of reviewers have been stored in said second memory unit;

updating the contents of the stored reviewed form using the created statistical data; and transmitting a demand email when one of the response forms is not received at a specified timeout in response to the review request form, wherein the generating of the single critique analysis comprises processing, based upon the received response form critiques, each target phrase in the reviewed form, and when a conflict between a target phrase and the stipulations in the response form critiques is indicated by the reviewers as a correction and/or a suggested change, skipping a calculation of an agreement rate and calculating evaluations regarding the correction and/or the suggested change in the target phrase.

* * * * *